(12) United States Patent
Hsu et al.

(10) Patent No.: US 12,407,245 B2
(45) Date of Patent: Sep. 2, 2025

(54) POWER CONVERTER IMPROVING INPUT OVERVOLTAGE FROM OUTPUT VOLTAGE DROP

(71) Applicant: ANPEC ELECTRONICS CORPORATION, Hsinchu (TW)

(72) Inventors: Chun-Kai Hsu, Hsinchu (TW); Chih-Heng Su, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 198 days.

(21) Appl. No.: 18/508,185

(22) Filed: Nov. 13, 2023

(65) Prior Publication Data

US 2025/0088091 A1 Mar. 13, 2025

(30) Foreign Application Priority Data

Sep. 7, 2023 (TW) .................................. 112133963

(51) Int. Cl.
*H02M 1/00* (2007.01)
*H02M 1/14* (2006.01)
*H02M 3/158* (2006.01)

(52) U.S. Cl.
CPC ......... *H02M 1/143* (2013.01); *H02M 1/0003* (2021.05); *H02M 3/158* (2013.01)

(58) Field of Classification Search
CPC .. H02M 1/12; H02M 3/3155; H02M 3/33507; H02M 3/33546; H02M 7/1557; H02M 7/1626; H02M 1/4208; H02M 7/53871; H02M 7/12; H02M 7/219; H02M 7/151; H02M 1/4233; H02M 5/4585; H02M 7/217; H02M 1/08; H02M 7/1552; H02M 7/1623; H02M 1/4225; H02M 3/33592; H02M 3/073; H02M 3/10; H02M 3/135; H02M 3/137; H02M 7/10; H02M 7/00; H02M 7/06; H02M 7/064; H02M 7/068; H02M 1/32; H02M 2001/322; H02M 2001/327; H02M 1/34; H02M 2001/342; H02M 2001/344; H02M 2001/346; H02M 2001/348; H02M 1/36; H02M 1/38;

(Continued)

(56) References Cited

U.S. PATENT DOCUMENTS 10,122,279 B2 * 11/2018 Zhang ..................... H02M 1/08
10,218,258 B1 * 2/2019 Nagl ....................... H02M 1/08

(Continued)

*Primary Examiner* — Sean Kayes
*Assistant Examiner* — Nusrat Quddus
(74) *Attorney, Agent, or Firm* — Li & Cai Intellectual Property Office

(57) ABSTRACT

A power converter improving input overvoltage from output voltage drop is provided. The power converter includes a high-side switch, a low-side switch, a control circuit, a voltage threshold determining circuit and a voltage drop suppression circuit. The voltage threshold determining circuit determines whether or not an output voltage of the power converter is dropping to determine or adjust a voltage threshold. The voltage drop suppression circuit detects a voltage of a first terminal of the high-side switch. When the voltage drop suppression circuit determines that the detected voltage of the first terminal of the high-side switch is higher than the voltage threshold, the voltage drop suppression circuit pulls down the voltage of the first terminal of the high-side switch.

20 Claims, 6 Drawing Sheets

(58) Field of Classification Search
CPC .... H02M 1/42; H02M 1/4216; H02M 1/4241; H02M 1/425; H02M 1/4258; H02M 1/4266; H02M 2001/4275; H02M 2001/4283; H02M 2001/4291; H02M 5/2573; H02M 1/081; H02M 5/293; H02M 3/125; H02M 3/13; H02M 3/145; H02M 3/15; H02M 3/155; H02M 3/156; H02M 3/158; H02M 3/1588; H02M 2003/1566; H02M 3/1582; H02M 2003/1557; G05F 1/30; G05F 1/33; G05F 1/32; G05F 1/34; G05F 1/38; G05F 1/52; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02J 7/12; G01R 19/165; G01R 19/16504; G01R 19/16509; G01R 19/16514; G01R 19/16519; G01R 19/16523; G01R 19/16528; G01R 19/16533; G01R 19/16538; G01R 19/16542; G01R 19/16547; G01R 19/16552; G01R 19/16557; G01R 19/16561; G01R 19/16566; G01R 19/16571; G01R 19/16576; G01R 19/1658; G01R 19/16585; G01R 19/1659; G01R 19/16595; G01R 19/17; H05B 39/048; B23K 11/24; H04B 2215/069
See application file for complete search history.

(56) References Cited

U.S. PATENT DOCUMENTS

| | | | | |
|---|---|---|---|---|
| 10,770,964 | B1* | 9/2020 | Su | H02M 1/08 |
| 10,845,833 | B1* | 11/2020 | Dietrich | H02M 3/1588 |
| 11,755,048 | B2* | 9/2023 | Rodriguez | H02M 3/158 323/356 |
| 2012/0206121 | A1* | 8/2012 | Evans | H02M 3/156 323/288 |
| 2013/0187626 | A1* | 7/2013 | Su | H02M 3/158 323/311 |
| 2017/0288550 | A1* | 10/2017 | Park | H02M 3/1582 |
| 2018/0054118 | A1* | 2/2018 | Lee | H02M 3/157 |
| 2018/0375434 | A1* | 12/2018 | Biziitu | H02M 3/158 |
| 2019/0181859 | A1* | 6/2019 | Wibben | H03K 17/6871 |
| 2021/0126537 | A1* | 4/2021 | Lalithambika | H02M 3/158 |
| 2021/0399637 | A1* | 12/2021 | Guan | H02M 1/327 |
| 2022/0069715 | A1* | 3/2022 | Karri | H02M 3/1582 |
| 2022/0393586 | A1* | 12/2022 | Yamakoshi | H02M 1/0025 |
| 2024/0097555 | A1* | 3/2024 | Ptacek | H02M 1/08 |
| 2025/0096680 | A1* | 3/2025 | Shah | H02M 3/158 |

* cited by examiner

POWER CONVERTER IMPROVING INPUT OVERVOLTAGE FROM OUTPUT VOLTAGE DROP

CROSS-REFERENCE TO RELATED PATENT APPLICATION

This application claims the benefit of priority to Taiwan Patent Application No. 112133963, filed on Sep. 7, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter improving input overvoltage from output voltage drop.

BACKGROUND OF THE DISCLOSURE

Power converters are indispensable for electronic devices. The power converters are used to adjust power and supply the adjusted power to the electronic devices. A high-side switch and a low side switch of the power converter must be switched according to voltages or currents of circuit components in the power converter such that the power converter supplies appropriate power to a load.

However, capacitors having large capacitances need to be disposed at an output terminal of the power converter to meet transient response requirements of a heavy load. Under this condition, an increase in an input voltage of the power converter is caused by energy generated when an output voltage signal of the power converter slopes downward. As a result, the circuit components of the power converter are not able to function correctly or can even be damaged.

SUMMARY OF THE DISCLOSURE

In response to the above-referenced technical inadequacies, the present disclosure provides a power converter improving input overvoltage from output voltage drop. The power converter includes a high-side switch, a low-side switch, a control circuit, a voltage threshold determining circuit and a voltage drop suppression circuit. A first terminal of the high-side switch is connected to an input voltage source and receives an input voltage from the input voltage source. A first terminal of the low-side switch is connected to a second terminal of the high-side switch. A second terminal of the low-side switch is grounded. A node between the first terminal of the low-side switch and the second terminal of the high-side switch is connected to a first terminal of an inductor. A second terminal of the inductor is connected to first terminals of one or more output capacitors. Second terminals of the one or more output capacitors are grounded. A node between the second terminal of the inductor and the first terminals of the one or more output capacitors is used as an output terminal of the power converter. The control circuit is connected to a control terminal of the high-side switch and a control terminal of the low-side switch. The control circuit is configured to control operations of the high-side switch and the low-side switch. The voltage threshold determining circuit is configured to determine whether an output voltage of an output voltage signal at the output terminal of the power converter is dropping according to an output voltage dropping signal from an external dropping indicating circuit connected thereto to determine or adjust a voltage threshold. The voltage threshold determining circuit is configured to output a voltage threshold indicating signal indicating the voltage threshold. The voltage drop suppression circuit is connected to the first terminal of the high-side switch and the voltage threshold determining circuit. The voltage drop suppression circuit is configured to detect a voltage of the first terminal of the high-side switch. When the voltage drop suppression circuit determines that the voltage of the first terminal of the high-side switch is higher than the voltage threshold indicated by the voltage threshold indicating signal from the voltage threshold determining circuit, the voltage drop suppression circuit pulls down the voltage of the first terminal of the high-side switch.

In one of the possible or preferred embodiments, the voltage threshold determining circuit adjusts the voltage threshold outputted to the voltage drop suppression circuit, according to a change in a state of a waveform of the output voltage signal of the power converter.

In one of the possible or preferred embodiments, when the voltage threshold determining circuit determines that the output voltage of the output voltage signal of the power converter is dropping, the voltage threshold determining circuit outputs the voltage threshold being equal to a first voltage threshold value to the voltage drop suppression circuit.

In one of the possible or preferred embodiments, when the voltage threshold determining circuit determines that the output voltage of the output voltage signal of the power converter is not dropping, the voltage threshold determining circuit outputs the voltage threshold being equal to a second voltage threshold value to the voltage drop suppression circuit.

In one of the possible or preferred embodiments, the second voltage threshold value is lower than the first voltage threshold value.

In one of the possible or preferred embodiments, when the voltage threshold determining circuit determines that a waveform of the output voltage signal of the power converter slopes downward, the voltage threshold determining circuit reduces the voltage threshold.

In one of the possible or preferred embodiments, the voltage threshold determining circuit determines whether a state that any one of a plurality of waveform segments of a plurality of waveforms of the output voltage signal of the power converter slopes downward is the same as a preset voltage sloping down state, and accordingly determines the voltage threshold.

In one of the possible or preferred embodiments, when a state that any one of a plurality of waveform segments of a plurality of waveforms of the output voltage signal is sloping down at the output terminal of the power converter is different from a preset voltage sloping down state, the voltage threshold determining circuit outputs the voltage threshold being equal to a first voltage threshold value to the voltage drop suppression circuit.

In one of the possible or preferred embodiments, when the state that the one of the plurality of waveform segments of the plurality of waveforms of the output voltage signal is sloping down at the output terminal of the power converter is the same as the preset voltage sloping down state, the voltage threshold determining circuit outputs the voltage threshold being equal to a second voltage threshold value to the voltage drop suppression circuit.

In one of the possible or preferred embodiments, the voltage threshold determining circuit sets a plurality of reference voltage values that correspond to a plurality of preset voltage sloping down states respectively. The voltage threshold determining circuit determines relationships between a falling state of any one of a plurality of falling waveform segments of a plurality of waveforms of the output voltage signal of the power converter and the plurality of preset voltage sloping down states, and accordingly selects one of the plurality of preset voltage sloping down states. The voltage threshold determining circuit adjusts the voltage threshold to be equal to one of the plurality of reference voltage values that corresponds to the one of the plurality of preset voltage sloping down states. The voltage threshold determining circuit outputs the voltage threshold that is adjusted to the voltage drop suppression circuit.

In one of the possible or preferred embodiments, when the voltage drop suppression circuit determines that a rising waveform segment is being generated in the output voltage signal of the power converter, the voltage threshold determining circuit outputs the voltage threshold being equal to a first voltage threshold value to the voltage drop suppression circuit.

In one of the possible or preferred embodiments, when the voltage drop suppression circuit determines that a falling waveform segment is being generated in the output voltage signal of the power converter, the voltage threshold determining circuit outputs the voltage threshold being equal to a second voltage threshold value to the voltage drop suppression circuit.

In one of the possible or preferred embodiments, the voltage threshold determining circuit includes a voltage sloping down determining circuit and a voltage threshold selecting circuit. The voltage sloping down determining circuit is configured to determine whether a waveform of the output voltage signal of the power converter is sloping down to output a voltage sloping down determined signal according to the output voltage dropping signal from the external dropping indicating circuit. The voltage threshold selecting circuit is connected to the voltage sloping down determining circuit and the voltage drop suppression circuit. When the voltage threshold selecting circuit determines that the waveform of the output voltage signal of the power converter is not sloping down according to the voltage sloping down determined signal from the voltage sloping down determining circuit, the voltage threshold selecting circuit outputs the voltage threshold being equal to a first voltage threshold value to the voltage drop suppression circuit. When the voltage threshold selecting circuit determines that the waveform of the output voltage signal of the power converter is sloping down according to the voltage sloping down determined signal from the voltage sloping down determining circuit, the voltage threshold determining circuit outputs the voltage threshold being equal to a second voltage threshold value to the voltage drop suppression circuit.

In one of the possible or preferred embodiments, before and after the voltage of the first terminal of the high-side switch is pulled down, the voltage drop suppression circuit detects the voltage of the first terminal of the high-side switch. The voltage drop suppression circuit compares the voltage of the first terminal of the high-side switch that is not yet pulled down with the voltage of the first terminal of the high-side switch that is pulled down to determine whether the voltage of the first terminal of the high-side switch is successfully pulled down and is clamped at a target voltage value to output a voltage pulling down result signal.

In one of the possible or preferred embodiments, the power converter further includes a low-side negative current limiting circuit. The low-side negative current limiting circuit is connected to the voltage drop suppression circuit and the control circuit. When the low-side negative current limiting circuit determines that the voltage of the first terminal of the high-side switch is not successfully pulled down or is not clamped at the target voltage value according to the voltage pulling down result signal from the voltage drop suppression circuit, the low-side negative current limiting circuit outputs a current limit instructing signal to the control circuit, and the control circuit adjusts the operation of the low-side switch according to the current limit instructing signal.

In one of the possible or preferred embodiments, the control circuit controls the operation of the low-side switch, such that an on-time of the low-side switch is shortened according to the current limit instructing signal from the low-side negative current limiting circuit.

In one of the possible or preferred embodiments, the power converter further includes a boot capacitor. A first terminal of the boot capacitor is coupled to a supply voltage and a second terminal of the boot capacitor is connected to the second terminal of the high-side switch.

In one of the possible or preferred embodiments, the power converter further includes a diode. A first terminal of the diode is coupled to the supply voltage. A second terminal of the diode is connected to the first terminal of the boot capacitor.

In one of the possible or preferred embodiments, the power converter further includes a high-side buffer. The high-side buffer is a buffer. An input terminal of the high-side buffer is connected to an output terminal of the control circuit. An output terminal of the high-side buffer is connected to the control terminal of the high-side switch.

In one of the possible or preferred embodiments, the power converter further includes a low-side buffer that is a buffer. An input terminal of the low-side buffer is connected to an output terminal of the control circuit. An output terminal of the low-side buffer is connected to the control terminal of the low-side switch.

As described above, the present disclosure provides the power converter improving the input overvoltage from the output voltage drop. When the output voltage signal of the power converter of the present disclosure is sloping down, the voltage threshold is reduced. If the voltage of the first terminal of the high-side switch is lower than the reduced voltage threshold, the voltage of the first terminal of the high-side switch is directly pulled down to the low voltage value, and even the on-time of the high-side switch of the power converter of the present disclosure is adjusted. As a result, the circuit components of the power converter of the present disclosure and the input voltage source connected thereto are prevented from being damaged and prevented from operating incorrectly.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
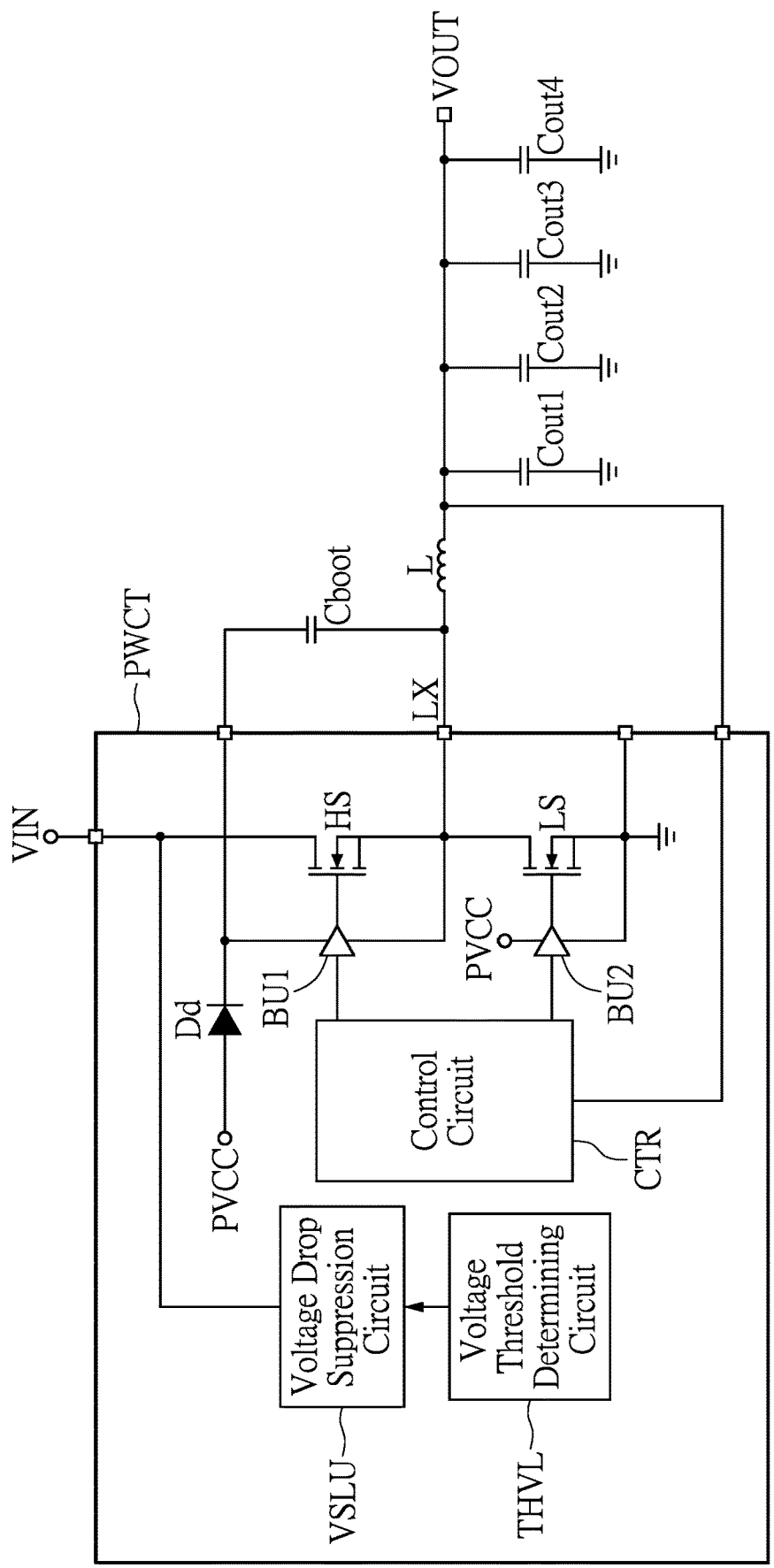
FIG. 1 is a circuit diagram of a power converter improving input overvoltage from output voltage drop according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
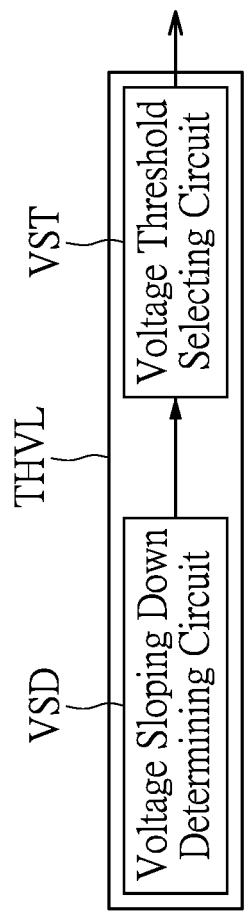
FIG. 2 is a block diagram of a voltage threshold determining circuit of the power converter improving the input overvoltage from the output voltage drop according to the first embodiment of the present disclosure.
Figure 3:
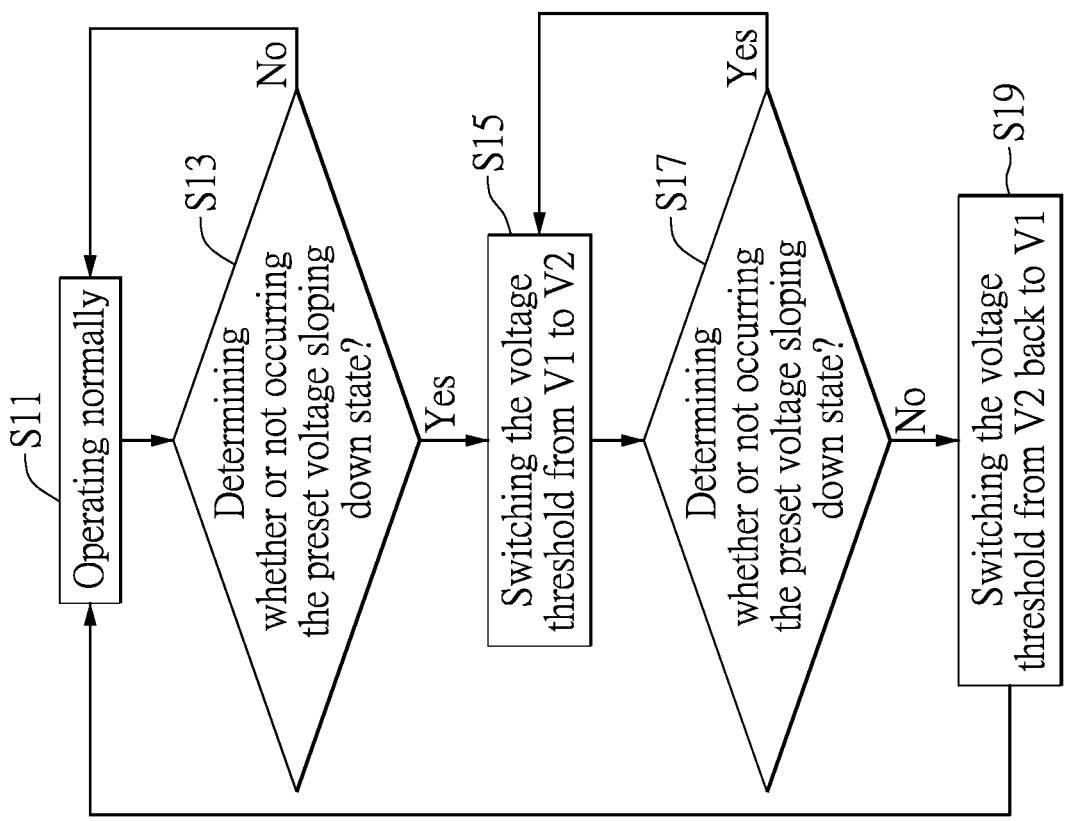
FIG. 3 is a flowchart diagram of steps performed by the power converter improving the input overvoltage from the output voltage drop according to the first embodiment of the present disclosure.

Reference is made to FIGS. 1 to 5, in which FIG. 1 is a circuit diagram of a power converter improving input overvoltage from output voltage drop according to a first embodiment of the present disclosure, FIG. 2 is a block diagram of a voltage threshold determining circuit of the power converter improving the input overvoltage from the output voltage drop according to the first embodiment of the present disclosure, and FIG. 3 is a flowchart diagram of steps performed by the power converter improving the input overvoltage from the output voltage drop according to the first embodiment of the present disclosure.

In the first embodiment, a power converter PWCT of the present disclosure includes a high-side switch HS, a low-side switch LS, a control circuit CTR, a voltage threshold determining circuit THVL and a voltage drop suppression circuit VSLU. If necessary, the power converter PWCT of the present disclosure may further include a boot capacitor Cboot, a diode Dd, a high-side buffer BU1, a low-side buffer BU2, or any combination thereof.

A first terminal of the high-side switch HS is connected to an input voltage source and receives an input voltage VIN from the input voltage source. A first terminal of the low-side switch LS is connected to a second terminal of the high-side switch HS. A second terminal of the low-side switch LS is grounded. A node LX between the first terminal of the low-side switch LS and the second terminal of the high-side switch HS is connected to a first terminal of an inductor L. A second terminal of the inductor L is connected to first terminals of one or more output capacitors such as, but not limited to, first terminals of output capacitors Cout1 to Cout4 as shown in FIG. 1. Second terminals of the output capacitors Cout1 to Cout4 are grounded. A node between the second terminal of the inductor L and the first terminals of the output capacitors Cout1 to Cout4 is used as an output terminal of the power converter PWCT.

The high-side buffer BU1 is a buffer. An input terminal of the high-side buffer BU1 is connected to an output terminal of the control circuit CTR. An output terminal of the high-side buffer BU1 is connected to a control terminal of the high-side switch HS. A negative terminal of the high-side buffer BU1 is connected to the second terminal of the high-side switch HS.

An anode of the diode Dd is coupled to a supply voltage PVCC. A cathode of the diode Dd is connected to a positive terminal of the high-side buffer BU1 and a first terminal of the boot capacitor Cboot. A second terminal of the boot capacitor Cboot is connected to the node LX between the first terminal of the low-side switch LS and the second terminal of the high-side switch HS, and is connected to the first terminal of the inductor L.

The low-side buffer BU2 is a buffer. An input terminal of the low-side buffer BU2 is connected to the output terminal of the control circuit CTR. An output terminal of the low-side buffer BU2 is connected to a control terminal of the low-side switch LS. A positive terminal of the low-side buffer BU2 is coupled to the supply voltage PVCC. A negative terminal of the low-side buffer BU2 is grounded.

The control circuit CTR is connected to the node (that is the output terminal of the power converter PWCT) between the second terminal of the inductor L and the first terminals of the output capacitors Cout1 to Cout4. The control circuit CTR may receive an output voltage VOUT of the power converter PWCT from the node between the second terminal of the inductor L and the first terminals of the output capacitors Cout1 to Cout4. The control circuit CTR may control operations of the high-side switch HS and the low-side switch LS according to the output voltage VOUT of the power converter PWCT.

The control circuit CTR may alternatively switch the high-side switch HS and the low-side switch LS (in step S11 as shown in FIG. 3).

When the control circuit CTR turns off the high-side switch HS and turns on the low-side switch LS (in step S11 as shown in FIG. 3), an output current flows from the output terminal of the power converter PWCT sequentially through the inductor L and the low-side switch LS being turned on to a ground. When the control circuit CTR turns off the low-side switch LS, the output current flows from the output terminal of the power converter PWCT through the high-side switch HS back to the input voltage source that is used to supply the input voltage VIN.

After the control circuit CTR turns off the high-side switch HS and turns on the low-side switch LS for a long period of time, the output voltage VOUT of the power converter PWCT that is supplied to the input voltage source used to supply the input voltage VIN is gradually increased to be a high voltage, which causes the high-side switch HS and other circuit components of the power converter PWCT to be damaged due to overvoltage.

It is worth noting that, as shown in FIG. 1, in the power converter PWCT of the present disclosure, the voltage threshold determining circuit THVL and the voltage drop suppression circuit VSLU are disposed for preventing the high-side switch HS and other circuit components of the power converter PWCT from being damaged due to overvoltage.

As shown in FIG. 2, the voltage threshold determining circuit THVL of the power converter PWCT of the present disclosure may include a voltage sloping down determining circuit VSD and a voltage threshold selecting circuit VST.

The voltage sloping down determining circuit VSD is connected to the voltage threshold selecting circuit VST. The voltage threshold selecting circuit VST of the voltage threshold determining circuit THVL is connected to the voltage drop suppression circuit VSLU. The voltage drop suppression circuit VSLU is connected to the first terminal of the high-side switch HS.

The voltage sloping down determining circuit VSD of the voltage threshold determining circuit THVL, according to an output voltage dropping signal from an external dropping indicating circuit, determines whether the output voltage VOUT of the output voltage signal at the output terminal of the power converter PWCT is dropping to output a voltage sloping down determined signal.

The voltage sloping down determining circuit VSD of the voltage threshold determining circuit THVL may determine, according to the output voltage dropping signal from the external dropping indicating circuit, whether a state that any one of a plurality of waveform segments of a plurality of waveforms of the output voltage signal of the power converter PWCT is sloping down is the same as a preset voltage sloping down state to output the voltage sloping down determined signal (in step S13 as shown in FIG. 3).

The voltage threshold selecting circuit VST of the voltage threshold determining circuit THVL determines or adjusts a voltage threshold according to the voltage sloping down determined signal from the voltage sloping down determining circuit VSD. The voltage threshold selecting circuit VST of the voltage threshold determining circuit THVL outputs a voltage threshold indicating signal indicating the determined or adjusted voltage threshold to the voltage drop suppression circuit VSLU.

For example, the voltage sloping down determining circuit VSD of the voltage threshold determining circuit THVL may determine that the waveform of the output voltage signal of the power converter PWCT is not sloping down. Alternatively, the voltage sloping down determining circuit VSD may determine that a rising waveform segment is generating in the output voltage signal of the power converter PWCT. Alternatively, the voltage sloping down determining circuit VSD may determine that the state or a slope of the waveform of the output voltage signal being sloped down is different from the preset voltage sloping down state. Under this condition, the voltage threshold selecting circuit VST of the voltage threshold determining circuit THVL outputs the voltage threshold indicating signal indicating the voltage threshold being equal to the first voltage threshold value to the voltage drop suppression circuit VSLU.

Conversely, the voltage sloping down determining circuit VSD of the voltage threshold determining circuit THVL may determine that the waveform of the output voltage signal of the power converter PWCT is sloping down. Alternatively, the voltage sloping down determining circuit VSD may determine that a falling waveform segment is generating in the output voltage signal of the power converter PWCT. Alternatively, the voltage sloping down determining circuit VSD may determine that the state or the slope of the waveform of the output voltage signal being sloped down is the same as the preset voltage sloping down state. Under this condition, the voltage threshold selecting circuit VST of the voltage threshold determining circuit THVL outputs the voltage threshold indicating signal indicating the voltage threshold being equal to the second voltage threshold value to the voltage drop suppression circuit VSLU. The second voltage threshold value is lower than the first voltage threshold value as described herein.

That is, when the voltage threshold selecting circuit VST of the voltage threshold determining circuit THVL determines that the waveform of the output voltage signal of the power converter PWCT is sloping down, the voltage threshold selecting circuit VST of the voltage threshold determining circuit THVL reduces the voltage threshold.

For example, when the output voltage signal of the power converter PWCT is not in the preset voltage sloping down state, the voltage threshold selecting circuit VST of the voltage threshold determining circuit THVL outputs the voltage threshold indicating signal indicating that the voltage threshold is equal to the first voltage threshold value to the voltage drop suppression circuit VSLU (in step S11 returning from step S13 as shown in FIG. 3).

Conversely, when the output voltage signal of the power converter PWCT is switched to the preset voltage sloping down state, the voltage threshold selecting circuit VST of the voltage threshold determining circuit THVL outputs the voltage threshold indicating signal indicating that the voltage threshold is equal to the second voltage threshold value to the voltage drop suppression circuit VSLU (in step S15 as shown in FIG. 3). That is, the voltage threshold outputted to the voltage drop suppression circuit VSLU is switched from the first voltage threshold value (represented by V1 in FIG. 3) to the second voltage threshold value (represented by V2 in FIG. 3).

The voltage drop suppression circuit VSLU is connected to the first terminal of the high-side switch HS and the voltage threshold determining circuit THVL. The voltage drop suppression circuit VSLU detects a voltage of the first terminal of the high-side switch HS. The voltage drop suppression circuit VSLU determines whether the voltage of the first terminal (such as a drain terminal) of the high-side switch HS is higher than the voltage threshold indicated by the voltage threshold indicating signal from the voltage threshold determining circuit THVL.

When the voltage drop suppression circuit VSLU determines that the voltage of the first terminal of the high-side switch HS is higher than the voltage threshold (that is equal to the first voltage threshold value V1 or the second voltage threshold value V2 as shown in FIG. 3) as indicated by the voltage threshold indicating signal from the voltage threshold determining circuit THVL, the voltage drop suppression circuit VSLU pulls down the voltage of the first terminal of the high-side switch HS.

After the voltage drop suppression circuit VSLU pulls down the voltage of the first terminal of the high-side switch HS, the voltage sloping down determining circuit VSD of the voltage threshold determining circuit THVL may determine whether the output voltage signal of the power converter PWCT is in the preset voltage sloping down state (according to a next output voltage dropping signal from the external dropping indicating circuit) (in step S17 as shown in FIG. 3).

If the voltage of the first terminal of the high-side switch HS is pulled down by the voltage drop suppression circuit VSLU such that the output voltage signal of the power converter PWCT is released from the preset voltage sloping down state, the voltage threshold selecting circuit VST of the voltage threshold determining circuit THVL switches the voltage threshold indicated by the voltage threshold indicating signal outputted to the voltage drop suppression circuit VSLU from the first voltage threshold value V1 to the second voltage threshold value V2 (in step S19) as shown in FIG. 3.

That is, the voltage threshold is set to be equal to the first voltage threshold value V1 when the output voltage signal of the power converter PWCT is not in the preset voltage sloping down state, and the voltage threshold is set to be equal to the second voltage threshold value V2 when the output voltage signal of the power converter PWCT is in the preset voltage sloping down state, but the present disclosure is not limited thereto.

In practice, the voltage threshold selecting circuit VST of the voltage threshold determining circuit THVL may set or store a plurality of reference voltage values that correspond to a plurality of preset voltage sloping down states, respectively.

The voltage threshold selecting circuit VST of the voltage threshold determining circuit THVL, according to the voltage sloping down determined signal from the voltage sloping down determining circuit VSD, determines relationships between a falling state of any one of a plurality of falling waveform segments of the plurality of waveforms of the output voltage signal of the power converter and the plurality of preset voltage sloping down states to select one of the plurality of preset voltage sloping down states.

The voltage threshold selecting circuit VST of the voltage threshold determining circuit THVL adjusts the voltage threshold to be equal to one of the plurality of reference voltage values that corresponds to the one of the plurality of preset voltage sloping down states that is selected.

In other words, the voltage threshold selecting circuit VST of the voltage threshold determining circuit THVL adjusts the voltage threshold outputted to the voltage drop suppression circuit VSLU according to a change of a state in any one of the plurality of waveform segments of the plurality of waveforms of the output voltage signal of the power converter PWCT.

Figure 4:
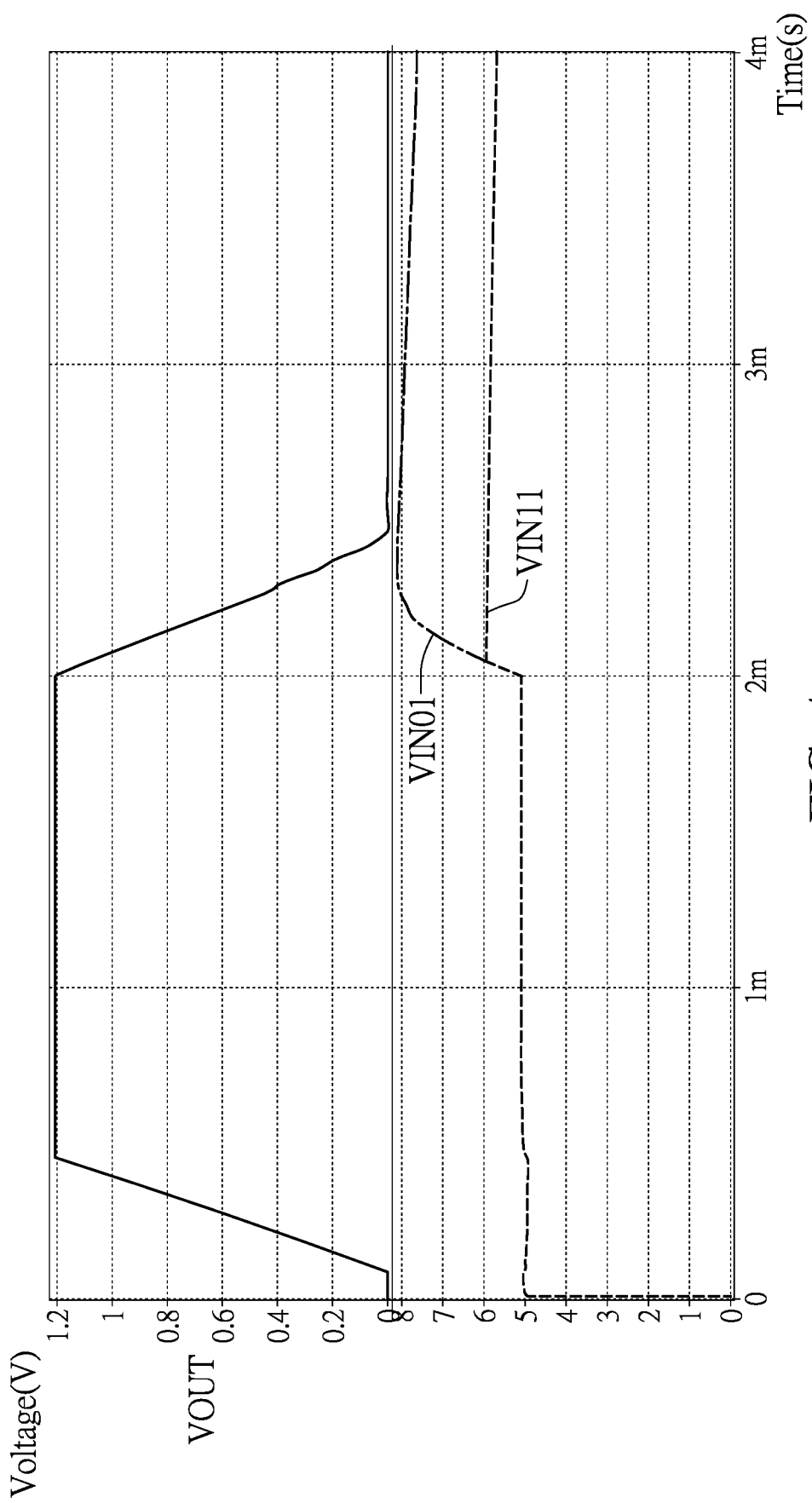
FIG. 4 is a waveform diagram of signals of the power converter of the first embodiment and a second embodiment of the present disclosure and a conventional power converter.
Figure 5:
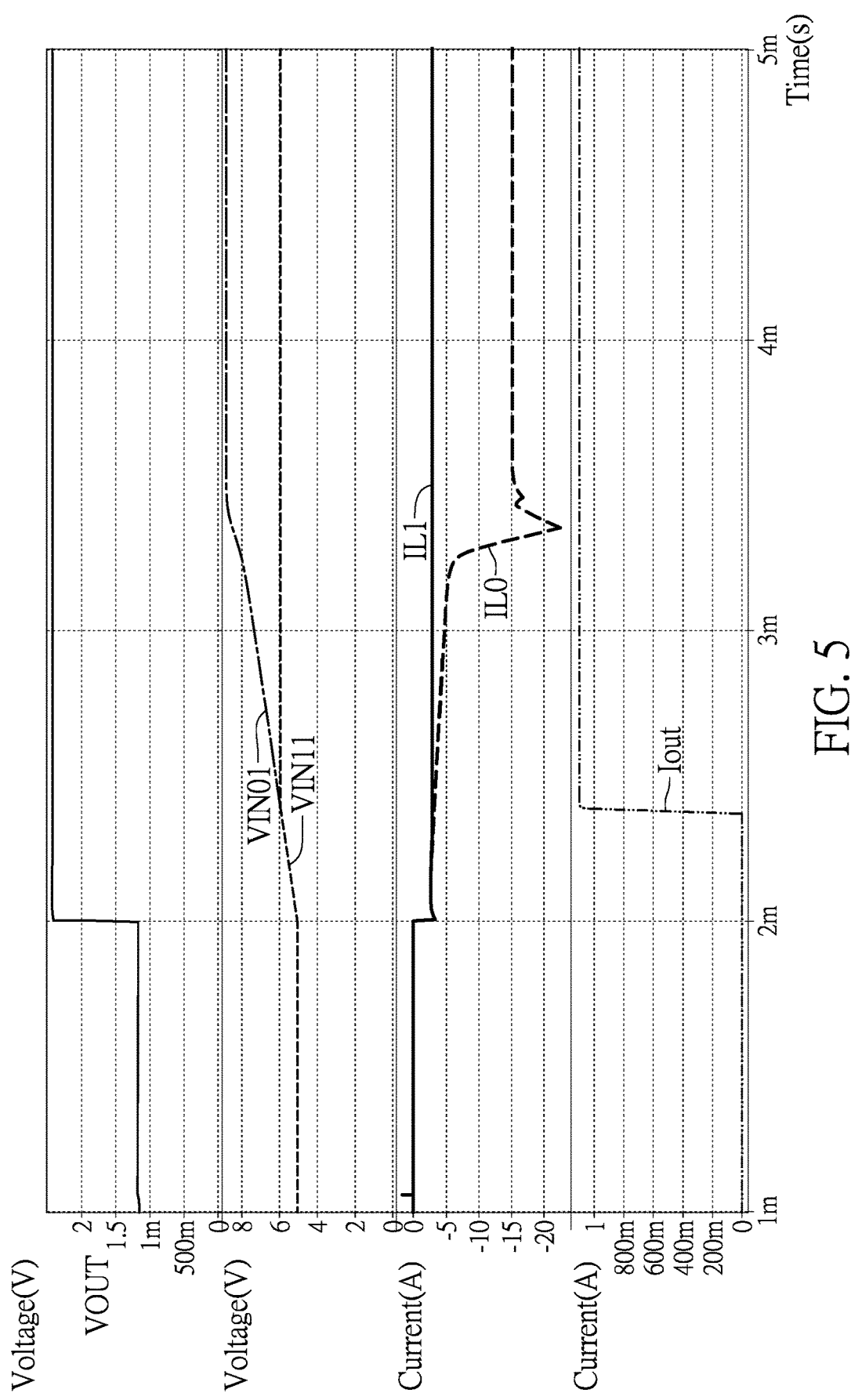
FIG. 5 is a waveform diagram of signals of the power converter of the first and second embodiments of the present disclosure and the conventional power converter.

Reference is made to FIGS. 4 and 5, in which FIG. 4 is a waveform diagram of signals of the power converter of the first embodiment and a second embodiment of the present disclosure and a conventional power converter, and FIG. 5 is a waveform diagram of signals of the power converter of the first and second embodiments of the present disclosure and the conventional power converter.

When an output voltage of a signal of the output voltage VOUT of the conventional power converter drops significantly, (a valley current value of) a reverse current ILO of the conventional power converter that flows back to an input voltage source through an inductor increases significantly such that a voltage of an input voltage signal VIN01 of the input voltage source connected to the conventional power converter increases to a high voltage value. As a result, the input voltage source and circuit components of the conventional power converter connected to the input voltage source are damaged due to overvoltage.

However, when the output voltage VOUT of the power converter of the present disclosure drops significantly, the voltage of the first terminal of the high-side switch of the power converter of the present disclosure is quickly pulled down and clamped at a low voltage value. At this time, a current Iout flows from the output terminal of the power converter of the present disclosure to the voltage drop suppression circuit VSLU of the power converter of the present disclosure instead of the input voltage source. Therefore, an input voltage VIN11 of the input voltage source is reduced. As a result, the circuit components of the power converter of the present disclosure and the input voltage source connected thereto are prevented from being damaged due to overvoltage.

Figure 6:
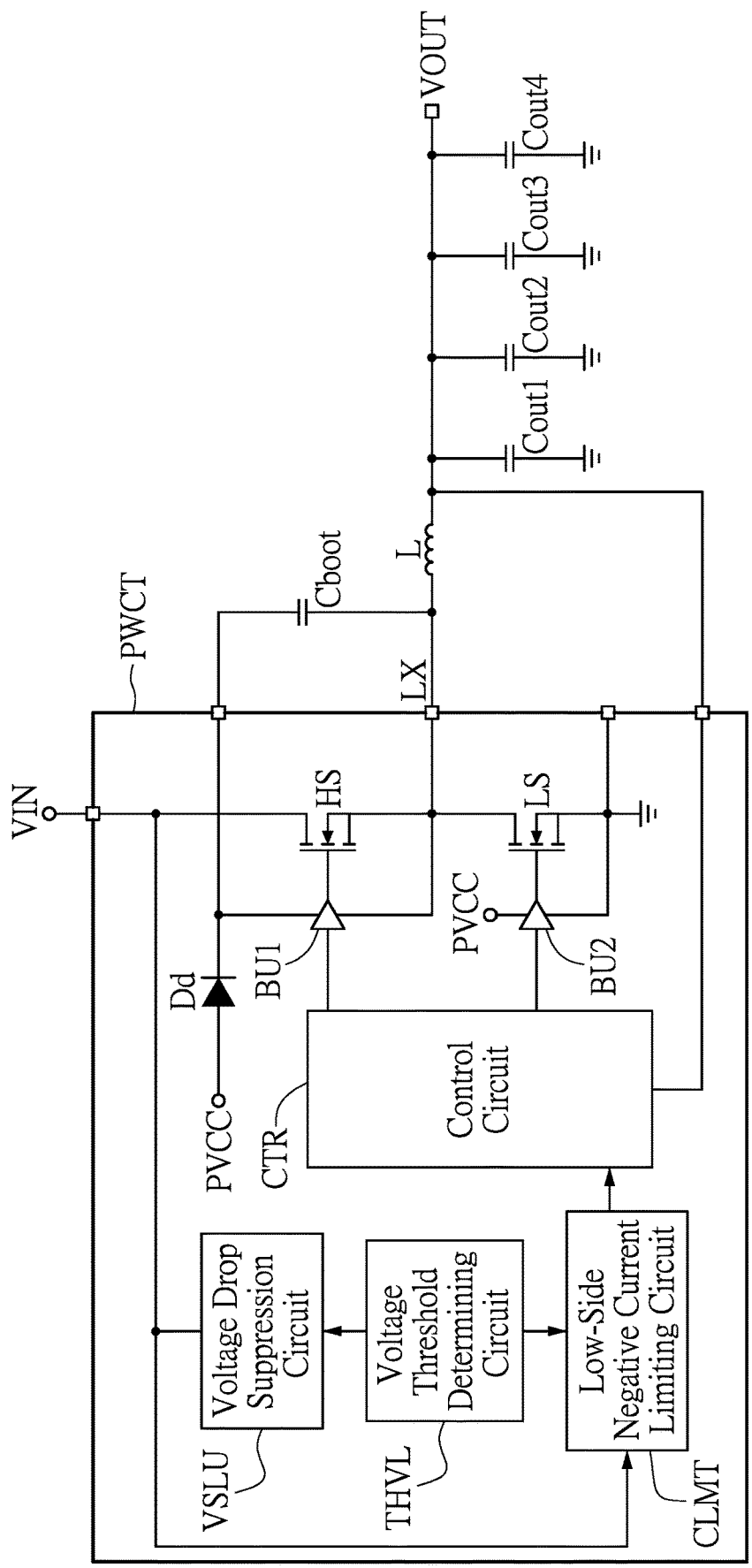
FIG. 6 is a circuit diagram of the power converter improving the input overvoltage from the output voltage drop according to the second embodiment of the present disclosure.

Reference is made to FIG. 6, which is a circuit diagram of the power converter improving the input overvoltage from the output voltage drop according to the second embodiment of the present disclosure. The contents of the second embodiment of the present disclosure that are the same as that of the first embodiment of the present disclosure are not repeated herein.

A difference between the second and first embodiments is that, the power converter PWCT of the second embodiment of the present disclosure further includes a low-side negative current limiting circuit CLMT.

The low-side negative current limiting circuit CLMT is connected to the voltage threshold determining circuit THVL and the control circuit CTR.

Before the voltage of the first terminal of the high-side switch HS is pulled down by the voltage drop suppression circuit VSLU, the voltage drop suppression circuit VSLU may detect the voltage of the first terminal of the high-side switch HS.

After the voltage of the first terminal of the high-side switch HS is pulled down by the voltage drop suppression circuit VSLU, the voltage drop suppression circuit VSLU may also detect the voltage of the first terminal of the high-side switch HS.

The voltage drop suppression circuit VSLU compares the voltage of the first terminal of the high-side switch HS that is not yet pulled down with the voltage of the first terminal of the high-side switch HS that is pulled down to determine whether the voltage of the first terminal of the high-side switch HS is successfully pulled down to a target voltage value and clamped at the target voltage value to output a voltage pulling down result signal.

The low-side negative current limiting circuit CLMT may determine that the voltage of the first terminal of the high-side switch HS is not successfully pulled down or is not clamped at the target voltage value according to the voltage pulling down result signal from the voltage drop suppression circuit VSLU. Under this condition, the low-side negative current limiting circuit CLMT outputs a current limit instructing signal according to the voltage pulling down result signal (and the voltage threshold outputted from the voltage threshold determining circuit THVL to the voltage drop suppression circuit VSLU).

The control circuit CTR controls the operations of the high-side switch HS and the low-side switch LS according to the current limit instructing signal from the low-side negative current limiting circuit CLMT.

For example, the control circuit CTR controls the operation of the low-side switch LS such that an on-time of the low-side switch LS is shortened according to the current limit instructing signal from the low-side negative current limiting circuit CLMT. As a result a current flowing back from the output terminal of the power converter PWCT of the present disclosure to the high-side switch HS, the input voltage source, the voltage drop suppression circuit VSLU and other circuit components is reduced. Therefore, the input voltage source, the high-side switch HS, the voltage drop suppression circuit VSLU and other circuit components of the power converter PWCT of the present disclosure are prevented from being damaged due to overvoltage.

In conclusion, the present disclosure provides the power converter improving the input overvoltage from the output voltage drop. When the output voltage signal of the power converter of the present disclosure is sloping down, the voltage threshold is reduced. If the voltage of the first terminal of the high-side switch is lower than the reduced voltage threshold, the voltage of the first terminal of the high-side switch is directly pulled down to the low voltage value, and even the on-time of the high-side switch of the power converter of the present disclosure is adjusted. As a result, the circuit components of the power converter of the present disclosure and the input voltage source connected thereto are prevented from being damaged and prevented from operating incorrectly.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter improving input overvoltage from output voltage drop, comprising:
   a high-side switch, wherein a first terminal of the high-side switch is connected to an input voltage source and receives an input voltage from the input voltage source;
   a low-side switch, wherein a first terminal of the low-side switch is connected to a second terminal of the high-side switch, a second terminal of the low-side switch is grounded, a node between the first terminal of the low-side switch and the second terminal of the high-side switch is connected to a first terminal of an inductor, a second terminal of the inductor is connected to first terminals of one or more output capacitors, second terminals of the one or more output capacitors are grounded, and a node between the second terminal of the inductor and the first terminals of the one or more output capacitors is used as an output terminal of the power converter;
   a control circuit connected to a control terminal of the high-side switch and a control terminal of the low-side switch, and configured to control operations of the high-side switch and the low-side switch; and
   a voltage threshold determining circuit configured to determine whether an output voltage of an output voltage signal at the output terminal of the power converter is dropping according to an output voltage dropping signal from an external dropping indicating circuit connected thereto to determine or adjust a voltage threshold, and configured to output a voltage threshold indicating signal indicating the voltage threshold; and
   a voltage drop suppression circuit connected to the first terminal of the high-side switch and the voltage threshold determining circuit and configured to detect a voltage of the first terminal of the high-side switch, wherein, when the voltage drop suppression circuit determines that the voltage of the first terminal of the high-side switch is higher than the voltage threshold indicated by the voltage threshold indicating signal from the voltage threshold determining circuit, the voltage drop suppression circuit pulls down the voltage of the first terminal of the high-side switch.

2. The power converter according to claim 1, wherein the voltage threshold determining circuit adjusts the voltage threshold outputted to the voltage drop suppression circuit according to a change in a state of a waveform of the output voltage signal of the power converter.

3. The power converter according to claim 1, wherein, when the voltage threshold determining circuit determines that the output voltage of the output voltage signal of the power converter is dropping, the voltage threshold determining circuit outputs the voltage threshold being equal to a first voltage threshold value to the voltage drop suppression circuit.

4. The power converter according to claim 3, wherein, when the voltage threshold determining circuit determines that the output voltage of the output voltage signal of the power converter is not dropping, the voltage threshold determining circuit outputs the voltage threshold being equal to a second voltage threshold value to the voltage drop suppression circuit.

5. The power converter according to claim 4, wherein the second voltage threshold value is lower than the first voltage threshold value.

6. The power converter according to claim 1, wherein, when the voltage threshold determining circuit determines that a waveform of the output voltage signal of the power converter slopes downward, the voltage threshold determining circuit reduces the voltage threshold.

7. The power converter according to claim 1, wherein the voltage threshold determining circuit determines whether a state that any one of a plurality of waveform segments of a plurality of waveforms of the output voltage signal of the power converter slopes downward is the same as a preset voltage sloping down state, and accordingly determines the voltage threshold.

8. The power converter according to claim 1, wherein, when a state that any one of a plurality of waveform segments of a plurality of waveforms of the output voltage signal is sloping down at the output terminal of the power converter is different from a preset voltage sloping down state, the voltage threshold determining circuit outputs the voltage threshold being equal to a first voltage threshold value to the voltage drop suppression circuit.

9. The power converter according to claim 8, wherein, when the state that the one of the plurality of waveform segments of the plurality of waveforms of the output voltage signal is sloping down at the output terminal of the power converter is the same as the preset voltage sloping down state, the voltage threshold determining circuit outputs the voltage threshold being equal to a second voltage threshold value to the voltage drop suppression circuit.

10. The power converter according to claim 1, wherein the voltage threshold determining circuit sets a plurality of reference voltage values that correspond to a plurality of preset voltage sloping down states respectively, the voltage threshold determining circuit determines relationships between a falling state of any one of a plurality of falling waveform segments of a plurality of waveforms of the output voltage signal of the power converter and the plurality of preset voltage sloping down states and accordingly selects one of the plurality of preset voltage sloping down states, the voltage threshold determining circuit adjusts the voltage threshold to be equal to one of the plurality of reference voltage values that corresponds to the one of the plurality of preset voltage sloping down states, and the voltage threshold determining circuit outputs the voltage threshold that is adjusted to the voltage drop suppression circuit.

11. The power converter according to claim 1, wherein, when the voltage drop suppression circuit determines that a rising waveform segment is being generated in the output voltage signal of the power converter, the voltage threshold determining circuit outputs the voltage threshold being equal to a first voltage threshold value to the voltage drop suppression circuit.

12. The power converter according to claim 11, wherein, when the voltage drop suppression circuit determines that a falling waveform segment is being generated in the output voltage signal of the power converter, the voltage threshold determining circuit outputs the voltage threshold being equal to a second voltage threshold value to the voltage drop suppression circuit.

13. The power converter according to claim 1, wherein the voltage threshold determining circuit includes:
   a voltage sloping down determining circuit configured to determine whether a waveform of the output voltage signal of the power converter is sloping down to output a voltage sloping down determined signal according to the output voltage dropping signal from the external dropping indicating circuit; and
   a voltage threshold selecting circuit connected to the voltage sloping down determining circuit and the voltage drop suppression circuit, wherein, when the voltage threshold selecting circuit determines that the waveform of the output voltage signal of the power converter is not sloping down according to the voltage sloping down determined signal from the voltage sloping down determining circuit, the voltage threshold selecting circuit outputs the voltage threshold being equal to a first voltage threshold value to the voltage drop suppression circuit, and when the voltage threshold selecting circuit determines that the waveform of the output voltage signal of the power converter is sloping down according to the voltage sloping down determined signal from the voltage sloping down determining circuit, the voltage threshold determining circuit outputs the voltage threshold being equal to a second voltage threshold value to the voltage drop suppression circuit.

14. The power converter according to claim 1, wherein, before and after the voltage of the first terminal of the high-side switch is pulled down, the voltage drop suppression circuit detects the voltage of the first terminal of the high-side switch, and the voltage drop suppression circuit compares the voltage of the first terminal of the high-side switch that is not yet pulled down with the voltage of the first terminal of the high-side switch that is pulled down to determine whether the voltage of the first terminal of the high-side switch is successfully pulled down and is clamped at a target voltage value to output a voltage pulling down result signal.

15. The power converter according to claim 14, further comprising:
   a low-side negative current limiting circuit connected to the voltage drop suppression circuit and the control circuit, wherein, when the low-side negative current limiting circuit determines that the voltage of the first terminal of the high-side switch is not successfully pulled down or is not clamped at the target voltage value according to the voltage pulling down result signal from the voltage drop suppression circuit, the low-side negative current limiting circuit outputs a current limit instructing signal to the control circuit, and the control circuit adjusts the operation of the low-side switch according to the current limit instructing signal.

16. The power converter according to claim 15, wherein the control circuit controls the operation of the low-side switch such that an on-time of the low-side switch is shortened according to the current limit instructing signal from the low-side negative current limiting circuit.

17. The power converter according to claim 1, further comprising:
   a boot capacitor, wherein a first terminal of the boot capacitor is coupled to a supply voltage, and a second terminal of the boot capacitor is connected to the second terminal of the high-side switch.

18. The power converter according to claim 17, further comprising:
   a diode, wherein a first terminal of the diode is coupled to the supply voltage, and a second terminal of the diode is connected to the first terminal of the boot capacitor.

19. The power converter according to claim 1, further comprising:
   a high-side buffer that is a buffer, wherein an input terminal of the high-side buffer is connected to an output terminal of the control circuit, and an output terminal of the high-side buffer is connected to the control terminal of the high-side switch.

20. The power converter according to claim 1, further comprising:
   a low-side buffer that is a buffer, wherein an input terminal of the low-side buffer is connected to an output terminal of the control circuit, and an output terminal of the low-side buffer is connected to the control terminal of the low-side switch.

* * * * *